(12) United States Patent
Botzer et al.

(10) Patent No.: US 11,950,715 B2
(45) Date of Patent: Apr. 9, 2024

(54) WALL HANGING DECORATIVE ASSEMBLY HAVING A FLEXIBLE STRIP WITH REMOVABLE ADHESIVE AND A NON-ADHESIVE GAP

(71) Applicant: Mixtiles Ltd., Tel-Aviv Yaffo (IL)

(72) Inventors: Ziv Botzer, Pardes-Hanna (IL); Nir Yaacov Beit-Av, Mevo Hama (IL)

(73) Assignee: Mixtiles Ltd., Tel-Aviv Yaffo (IL)

( * ) Notice: Subject to any disclaimer, the term of this patent is extended or adjusted under 35 U.S.C. 154(b) by 23 days.

(21) Appl. No.: 17/130,072

(22) Filed: Dec. 22, 2020

(65) Prior Publication Data

US 2021/0204723 A1    Jul. 8, 2021

Related U.S. Application Data

(60) Provisional application No. 62/958,340, filed on Jan. 8, 2020.

(51) Int. Cl.
    *A47G 1/17*      (2006.01)
    *A47G 1/16*      (2006.01)
    (Continued)

(52) U.S. Cl.
    CPC .............. *A47G 1/17* (2013.01); *A47G 1/1606* (2013.01); *A47G 1/175* (2013.01); *B44C 5/02* (2013.01);
    (Continued)

(58) Field of Classification Search
    CPC ........ A47G 1/17; A47G 1/1606; A47G 1/175; B44C 5/02; C09J 7/29; C09J 2423/106;
    (Continued)

(56) References Cited

U.S. PATENT DOCUMENTS

| 3,633,865 A | * | 1/1972 | Hogg | ........................ | A47G 1/17 |
| | | | | | 248/467 |
| 4,106,741 A | * | 8/1978 | Hogg | ........................ | A47G 1/17 |
| | | | | | 248/467 |

(Continued)

FOREIGN PATENT DOCUMENTS

| CH | 674638 | 6/1990 |
| CN | 2887161 | 4/2007 |

(Continued)

OTHER PUBLICATIONS

European Search Report and the European Search Opinion dated Jun. 2, 2021 From the European Patent Office Re. Application No. 20216665.8. (9 Pages).

(Continued)

*Primary Examiner* — Patricia L. Nordmeyer

(57) ABSTRACT

A decorative object assembly for attachment to a vertical surface includes a substantially planar decorative block defining an upper edge and a lower edge. A flexible planar strip is made of a thermoplastic polymer, and defines an upper edge parallel to the upper edge of the block, a lower edge parallel to the lower edge of the block, and a vertical direction between the upper and lower edges. A first layer of adhesive extends vertically downward from the upper edge of the strip, for releasable attachment to the vertical surface. An attachment mechanism for attachment to the decorative block is configured on a lower vertical section of the planar strip. A gap section of the strip is vertically located between the first layer of adhesive and the lower vertical section, on which no adhesive is adhered.

11 Claims, 12 Drawing Sheets

(51) Int. Cl.
 B44C 5/02 (2006.01)
 C09J 7/29 (2018.01)
(52) U.S. Cl.
 CPC ........... C09J 7/29 (2018.01); *C09J 2423/106* (2013.01); *C09J 2431/006* (2013.01); *C09J 2467/006* (2013.01); *Y10T 428/14* (2015.01); *Y10T 428/28* (2015.01)
(58) Field of Classification Search
 CPC ........... C09J 2431/006; C09J 2467/006; Y10T 428/14; Y10T 428/28
 See application file for complete search history.

(56) References Cited

U.S. PATENT DOCUMENTS

| | | | | |
|---|---|---|---|---|
| 4,258,493 | A * | 3/1981 | Kettlestrings | G09F 1/10 24/339 |
| 5,202,169 | A | 4/1993 | Spendlove et al. | |
| 5,437,428 | A * | 8/1995 | Mirza | A47G 1/17 40/594 |
| 5,672,404 | A * | 9/1997 | Callahan, Jr. | A44B 18/0073 604/389 |
| 5,747,131 | A | 5/1998 | Kreckel | |
| 6,120,867 | A * | 9/2000 | Hamerski | C09J 7/22 428/317.1 |
| 6,403,206 | B1 * | 6/2002 | Bries | C09J 7/29 428/354 |
| 6,406,781 | B1 | 6/2002 | Hamerski | |
| 6,558,789 | B1 * | 5/2003 | Hamerski | A47G 1/175 428/317.1 |
| 9,574,113 | B2 | 2/2017 | Crosby et al. | |
| 10,100,229 | B2 | 10/2018 | Crosby et al. | |
| 2002/0114909 | A1 * | 8/2002 | Aiello | C09J 7/22 428/40.1 |
| 2006/0021272 | A1 * | 2/2006 | Kleissler | A47J 27/17 40/773 |
| 2007/0104914 | A1 * | 5/2007 | Lewin | B32B 27/32 428/56 |
| 2014/0352881 | A1 * | 12/2014 | Crosby | A47G 1/175 156/60 |

FOREIGN PATENT DOCUMENTS

| | | |
|---|---|---|
| JP | 5-52329 | 7/1993 |
| JP | 2001-087118 | 4/2001 |
| JP | 2001-299559 | 10/2001 |
| WO | WO 99/037729 | 7/1999 |
| WO | WO 2006/023076 | 3/2006 |
| WO | WO 2008/119581 | 10/2008 |
| WO | WO 2013/109695 | 7/2013 |

OTHER PUBLICATIONS

Communication Pursuant to Article 94(3) EPC dated Feb. 22, 2023 From the European Patent Office Re. Application No. 20216665.8. (5 Pages).
Office Action Dated Jun. 11, 2023 From the Israel Patent Office Re. Application No. 279693. (5 Pages).
Communication Pursuant to Article 94(3) EPC dated Sep. 26, 2023 From the European Patent Office Re. Application No. 20216665.8 (6 Pages).

* cited by examiner

PRIOR ART
PRIOR ART
FIG. 2A  FIG. 2B
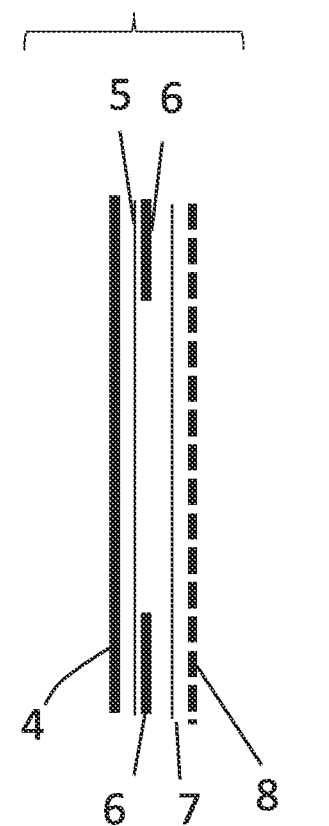
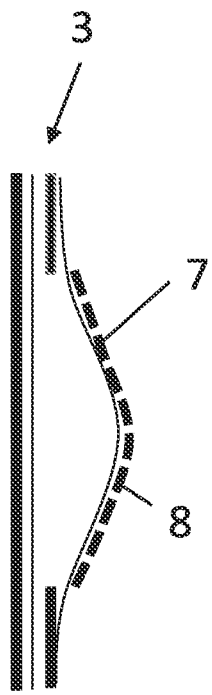
 Flexible Strip
 Permanent Adhesive
– – – – – Removable Adhesive

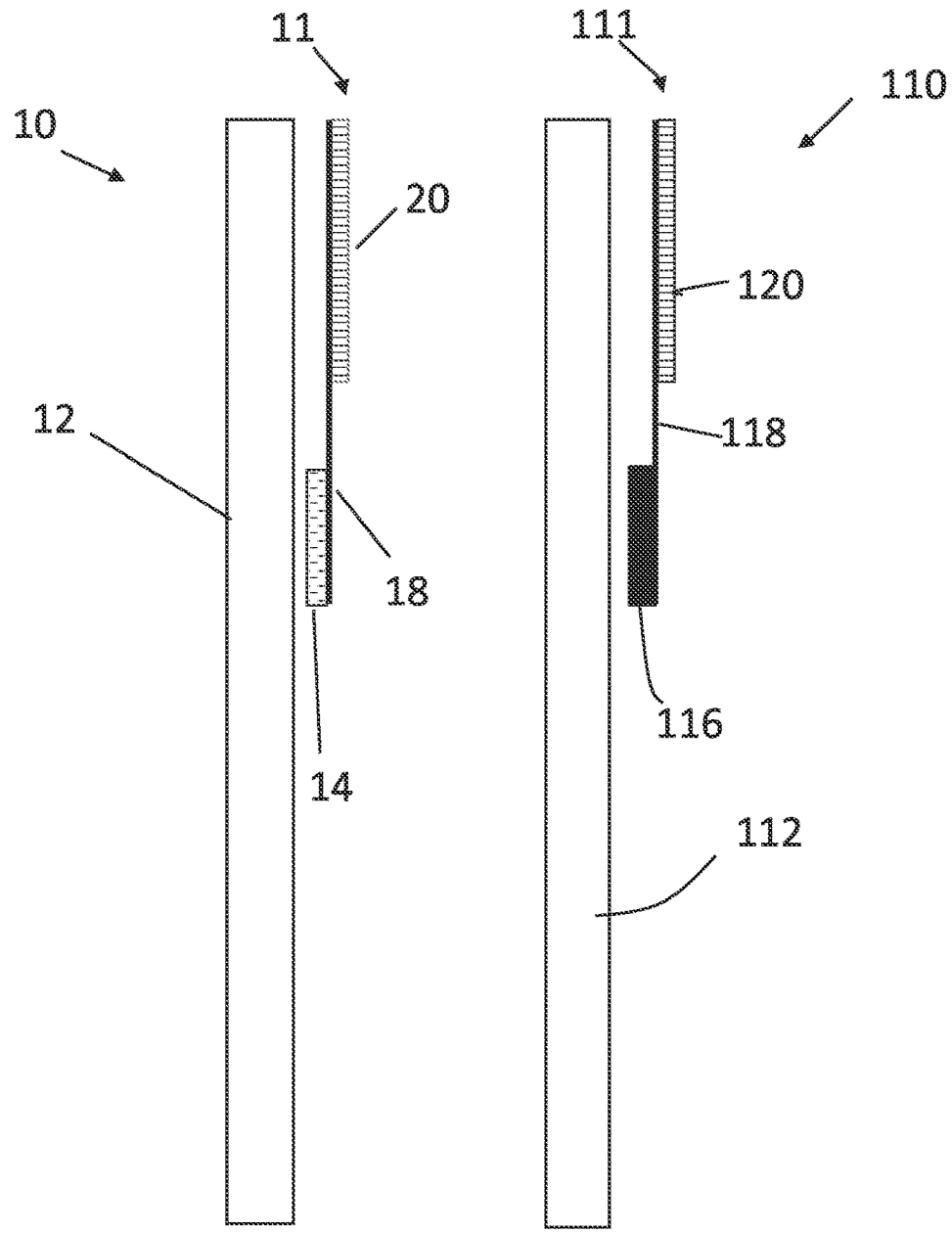

FIG. 3C
FIG. 3D
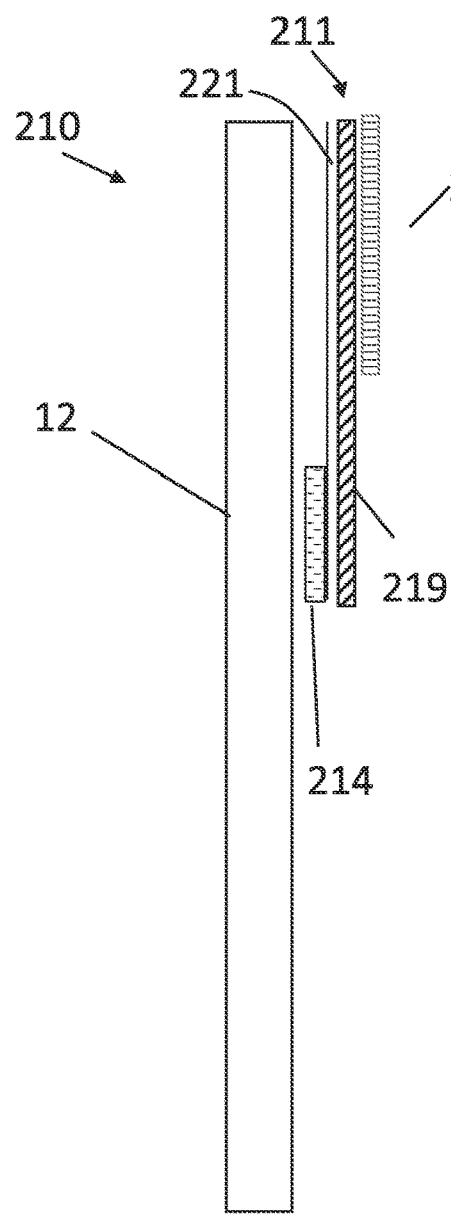
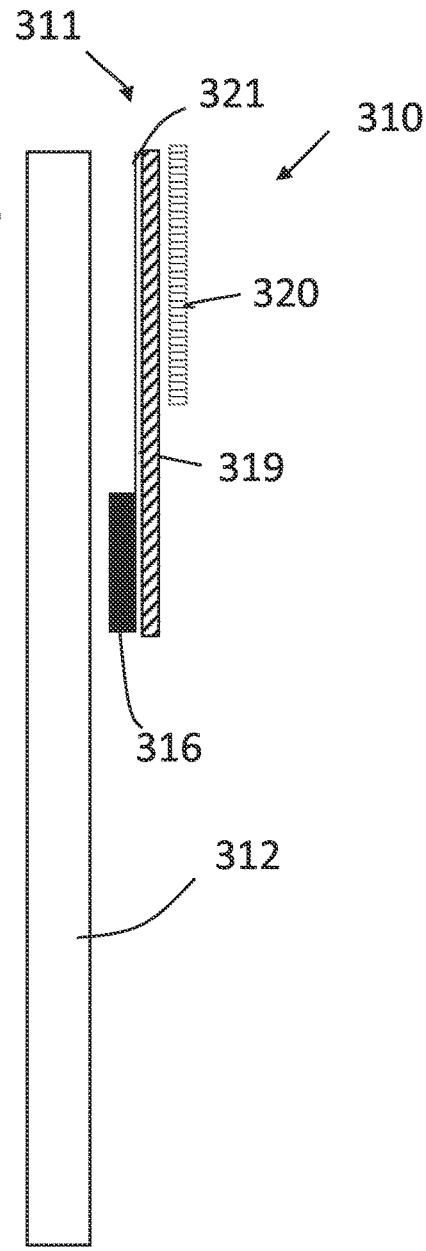
| | |
|---|---|
| 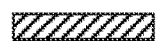 | EVA foam |
|  | Polymeric Backing |
|  | Mechanical connection |
|  | Permanent Adhesive |
|  | Removable Adhesive |
|  | Decorative Block |

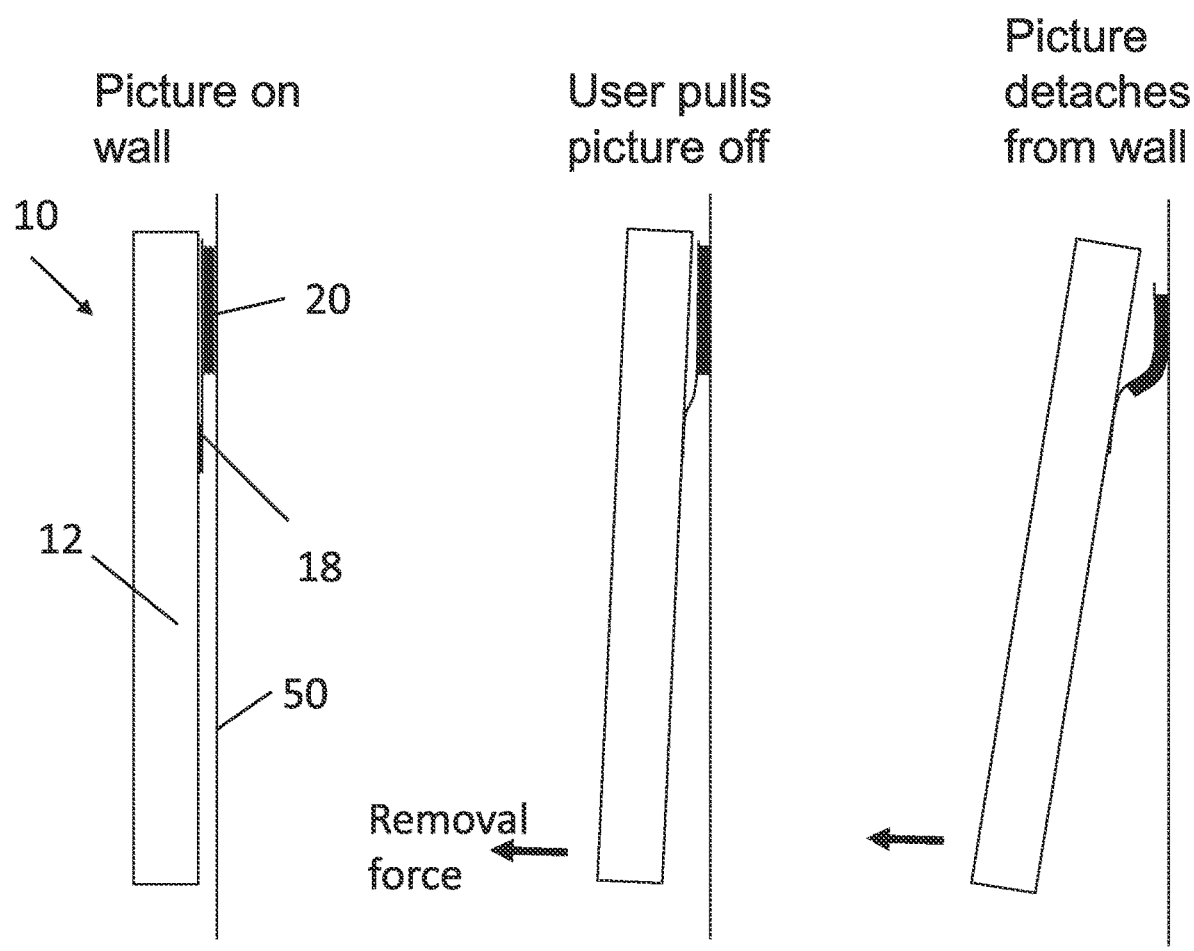

WALL HANGING DECORATIVE ASSEMBLY HAVING A FLEXIBLE STRIP WITH REMOVABLE ADHESIVE AND A NON-ADHESIVE GAP

RELATED APPLICATION(S)

This application claims the benefit of priority under 35 USC § 119(e) of U.S. Provisional Patent Application No. 62/958,340 filed on Jan. 8, 2020, the contents of which are incorporated by reference as if fully set forth herein in their entirety.

FIELD AND BACKGROUND OF THE INVENTION

The present invention, in some embodiments thereof, relates to an assembly for attaching decorative objects to a vertical surface, and more particularly, but not exclusively, to a wall hanging decorative assembly including a flexible strip with removable adhesive and a non-adhesive gap.

Adhesive strips for attaching decorative objects to vertical surfaces, for example posters or photo frames to walls, are known. Such adhesive strips may be a solid piece or object, with an adhesive adhered to both sides. One side of the adhesive solid piece is adhered to the decorative object, and a second side of the adhesive solid piece is attachable to the wall.

A typical process for removing decorative objects from a wall, when the decorative object is attached to the wall with such a typical adhesive strip, is shown in FIG. 1. In FIG. 1, object 1 is attached to a wall with adhesive strip 2. To remove the decorative object 1 from the wall, a user exerts lateral removal force on the bottom of the object 1, in the direction shown in the arrow. Initially, this lateral movement causes a pull force to be exerted on the bottom of adhesive strip 2, while causing a corresponding pressure into the wall at the top of adhesive strip 2. When the removal force is strong enough, the pull force overcomes the strength of the adhesive, and the decorative object 1 is removed from the wall.

In the process depicted in FIG. 1, the entire adhesive surface of adhesive strip 2 is pulled, almost simultaneously, from the wall. A strong pull force, sufficient to overcome the adhesive force of the entire adhesive strip 2, is required. Exertion of this pull force may lead to wall damage, for example, removal of paint from the wall. To limit this potential for wall damage, it is usually necessary to limit the size and position of the adhesive strip 2.

Another prior art model for an adhesive strip is shown in FIGS. 2A and 2B. Adhesive strip 3 includes a first permanent adhesive 4, extending along the entire height 5 of the adhesive strip, and two end sections 6 of permanent adhesive strip. A flexible solid strip 6 is placed between the first permanent adhesive 4 and the end sections 6. A second flexible strip 7 is placed anterior to the end sections, and a removable adhesive 8 is adhered to the second flexible strip 7. Removable adhesive 8 is attachable to a wall. As shown in FIG. 2B, it is theoretically possible to bend the second flexible strip 7 and removable adhesive 8, in such a way that only a small portion of removable adhesive 7 remains adhered to the wall. However, it is not typically possible to do so in an intuitive, ergonomically efficient manner.

SUMMARY OF THE INVENTION

It is an object of the present invention to provide an assembly for attaching a decorative object onto a vertical surface that is strong, yet easy to remove, without requiring excessive removal force that could damage the wall. It is also an object of the present invention to provide an attachment assembly for a decorative object that can be removed in an intuitive and ergonomically efficient manner.

According to a first aspect, a decorative object assembly for attachment to a vertical surface is disclosed. The decorative object assembly includes a substantially planar decorative block defining an upper edge and a lower edge. A flexible planar strip is made of a thermoplastic polymer, and defines an upper edge parallel to the upper edge of the block, a lower edge parallel to the lower edge of the block, and a vertical direction between the upper and lower edges. A first layer of adhesive extends vertically downward from the upper edge of the strip, for releasable attachment to the vertical surface. An attachment mechanism for attachment to the decorative block is configured on a lower vertical section of the planar strip. A gap section of the strip is vertically located between the first layer of adhesive and the lower vertical section, on which no adhesive is adhered.

Advantageously, the division of the flexible planar strip into a lower section with an attachment mechanism for attachment to the decorative block, an upper section with removable adhesive, and a gap section therebetween, allows the removable adhesive to be removed from a vertical surface gradually, through application of a horizontal pulling force on the bottom of the decorative object. This gradual removal exerts less force on the wall, thus lessening the potential to damage to the wall. Simultaneously, the removal is performed with a horizontal pull on the bottom of the decorative object, which is both intuitive and ergonomic.

In another implementation according to the first aspect, the attachment mechanism is a second layer of adhesive extending vertically upward from the lower edge of the flexible planar strip, attached to an opposing side of the strip from the first layer of adhesive, and permanently adhered between the block and the strip. Advantageously, this attachment mechanism may be compact and easily adhered to both the flexible strip and to the decorative block.

In another implementation according to the first aspect, a frame is configured around the decorative block, and a slot is within the frame for receiving therein a lower vertical section of the strip. Optionally, the attachment mechanism is a mechanical attachment for attaching the lower vertical section to the frame, such that, when the mechanical attachment is engaged, the lower vertical section is within the slot and is attached to the frame. In some such embodiments, the mechanical attachment comprises one or more protrusions within the slot that are adapted to cooperate with one or more corresponding holes in the lower section. The placement of the attachment mechanism within the frame may allow for an attachment that is more easily removed, or an attachment mechanism that is more aesthetically pleasing because it is concealed.

In another implementation according to the first aspect, a vertical length of the first layer of adhesive is greater than the vertical length of the lower vertical section, and a vertical length of the lower vertical section is greater than the vertical length of the gap section. Advantageously, such dimensions may produce optimal results, in terms of minimum force required to remove the decorative object from the wall.

In another implementation according to the first aspect, the flexible planar strip is composed of polyethylene terephthalate or polypropylene. Optionally, a vertical length of the gap section is approximately between 10 and 25 times a thickness of the flexible planar strip. Advantageously, polyethylene terephthalate and polypropylene are readily available, strong, and flexible polymers. Furthermore, on the basis of experimentation, it was determined that, for flexible planar strips comprised of these materials, a vertical length of the gap section of 10 to 25 times the thickness of the flexible planar strip produces optimal results, in terms of minimum force required to remove the decorative object from the wall.

In another implementation according to the first aspect, the flexible planar strip is composed of ethylene-vinyl acetate (EVA) foam. Optionally, a vertical length of the gap section is approximately between 2 to 4 times a thickness of the flexible planar strip. Advantageously, EVA foam is a readily available, strong, and flexible polymer. Furthermore, on the basis of experimentation, it was determined that, for flexible planar strips comprised of EVA foam, a vertical length of the gap section of 2 to 4 times the thickness of the flexible planar strip produces optimal results, in terms of minimum force required to remove the decorative object from the wall.

In another implementation according to the first aspect, a foam pad is configured between the planar strip and the first layer of adhesive, and is permanently adhered to the planar strip with a third layer of adhesive. Advantageously, the foam pad absorbs minor inconsistencies in a surface of a wall, and thereby reduces the chance of separation of the first layer of adhesive from the wall due to surface bumps.

In another implementation according to the first aspect, a removable siliconized liner is provided for lining the first layer of adhesive when it is not adhered to the vertical surface. The removable siliconized liner may help ensure that the first layer of adhesive is not accidentally adhered onto a surface.

In another implementation according to the first aspect, the planar strip is mechanically attached to the decorative block at the upper edge of the decorative block. Advantageously, this attachment point enables easy removal of the decorative block from a vertical surface, because the lower edge of the decorative block is not attached to the surface, and the user can thus remove the decorative block by pulling on the lower edge of the block.

According to a second implementation, a method of assembling a decorative object assembly is disclosed. The method includes adhering a first layer of adhesive to a flexible planar strip made of a thermoplastic polymer, the planar strip defining an upper edge, a lower edge, and a vertical direction between the upper and lower edges. The adhering step comprises adhering the first layer of adhesive onto an upper vertical section extending downward from the upper edge of the planar strip. The method further includes configuring an attachment mechanism for attachment to the decorative block on a lower vertical section of the planar strip. Following the adhering and configuring steps, the planar strip comprises a gap section vertically between the lower vertical section and the upper vertical section, on which no adhesive is adhered. The method further includes attaching, with the attachment mechanism, the lower vertical section of the planar strip to a substantially planar decorative block.

Advantageously, a decorative object assembly constructed according to the above-described method thus includes the flexible planar strip divided into a lower section with an attachment mechanism for attachment to the decorative block, an upper section with removable adhesive, and a gap section therebetween. This construction allows the removable adhesive to be removed from a vertical surface gradually, through application of a horizontal pulling force on the bottom of the decorative object. This gradual removal exerts less force on the wall, thus lessening the potential to damage to the wall. Simultaneously, the removal is performed with a horizontal pull on the bottom of the decorative object, which is both intuitive and ergonomic.

In another implementation according to the second aspect, either (1) the flexible planar strip is composed of polyethylene terephthalate or polypropylene, and a vertical length of the gap section is approximately between 10 and 25 times a thickness of the flexible planar strip, or (2) the flexible planar strip is composed of ethylene-vinyl acetate foam, and the vertical length of the gap section is approximately between 2 to 4 times a thickness of the flexible planar strip. Advantageously, polyethylene terephthalate, polypropylene, and EVA foam are readily available, strong, and flexible polymers. Furthermore, on the basis of experimentation, it was determined that, for flexible planar strips comprised of polyethylene terephthalate or polypropylene, a vertical length of the gap section of 10 to 25 times the thickness of the flexible planar strip produces optimal results, in terms of minimum force required to remove the decorative object from the wall. In addition, on the basis of experimentation, it was determined that, for flexible planar strips comprised of EVA foam, a vertical length of the gap section of 2 to 4 times the thickness of the flexible planar strip produces optimal results, in terms of minimum force required to remove the decorative object from the wall.

In another implementation according to the second aspect, the method further comprises configuring a foam pad between the planar strip and the first layer of adhesive, and permanently adhering the foam pad to the planar strip with a third layer of adhesive. Advantageously, the foam pad absorbs minor inconsistencies in a surface of a wall, and thereby reduces the chance of separation of the first layer of adhesive from the wall due to surface bumps.

In another implementation according to the second aspect, the attachment mechanism is a second layer of adhesive adhered to the lower vertical section, and the step of attaching the lower vertical section to the decorative block comprises permanently adhering the second layer of adhesive to the decorative block. Advantageously, this attachment mechanism may be compact and easily adhered to both the flexible strip and to the decorative block.

In another implementation according to the second aspect, the decorative block further comprises a frame configured at a perimeter thereof, and a slot within the frame for receiving therein the lower vertical section of the strip, the attachment mechanism is a mechanical attachment for attaching the lower vertical section to the frame, and the step of attaching the lower vertical section of the planar strip to the decorative block comprises engaging the mechanical attachment such that the lower vertical section is within the slot and is attached to the frame. The placement of the attachment mechanism within the frame may allow for an attachment that is more easily removed, or an attachment mechanism that is more aesthetically pleasing because it is concealed.

In another implementation according to the second aspect, the method comprises at least one of (1) lining the first layer of adhesive with a removable siliconized liner and (2) removing the siliconized liner from the first layer of adhesive. Advantageously, the removable siliconized liner may help ensure that the first layer of adhesive is not accidentally adhered onto a surface.

In another implementation according to the second aspect, the method further comprises releasably attaching the first layer of adhesive to a vertical surface, and thereby releasably hanging the decorative object on the vertical surface.

Optionally, the method further comprises removing the decorative object from the vertical surface. In such implementations, the removing step includes drawing the lower edge of the planar block away from the vertical surface in an upward angle; during the drawing step, flexing the gap section while the first layer of adhesive is completely attached to the wall; and peeling the first layer of adhesive off of the vertical surface in a bottom-to-top direction while the gap section remains flexed. Advantageously, this removal method allows application of minimal force on the vertical surface, thus reducing the possibility of damage to the vertical surface.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2A is a depiction of a second prior art assembly for attaching an object to a vertical surface;

FIG. 2B is a depiction of the prior art assembly in FIG. 2A, with a flexible membrane in a flexed position;

FIG. 3A is a schematic, cross-sectional view of a first embodiment of a decorative object assembly, with a flexible planar strip comprised of a solid polymer, and an attachment mechanism for attachment to the decorative object, according to embodiments of the invention;

FIG. 3B is a schematic, cross-sectional view of a second embodiment of a decorative object assembly, with a flexible planar strip comprised of a solid polymer, and a permanent adhesive for attachment to the decorative object, according to embodiments of the invention;

FIG. 3C is a schematic, cross-sectional view of a third embodiment of a decorative object assembly, with a flexible planar strip comprised of a strip of EVA foam supported by a polymeric backing, and an attachment mechanism for attachment to the decorative object, according to embodiments of the invention;

FIG. 3D is a schematic, cross-sectional view of a fourth embodiment of a decorative object assembly, with a flexible planar strip comprised of a strip of EVA foam supported by a polymeric backing, and a permanent adhesive for attachment to the decorative object, according to embodiments of the invention;

FIG. 4 depicts a method for removing a decorative object assembly from a vertical surface, according to embodiments of the invention.

DESCRIPTION OF SPECIFIC EMBODIMENTS OF THE INVENTION

Figure 1:
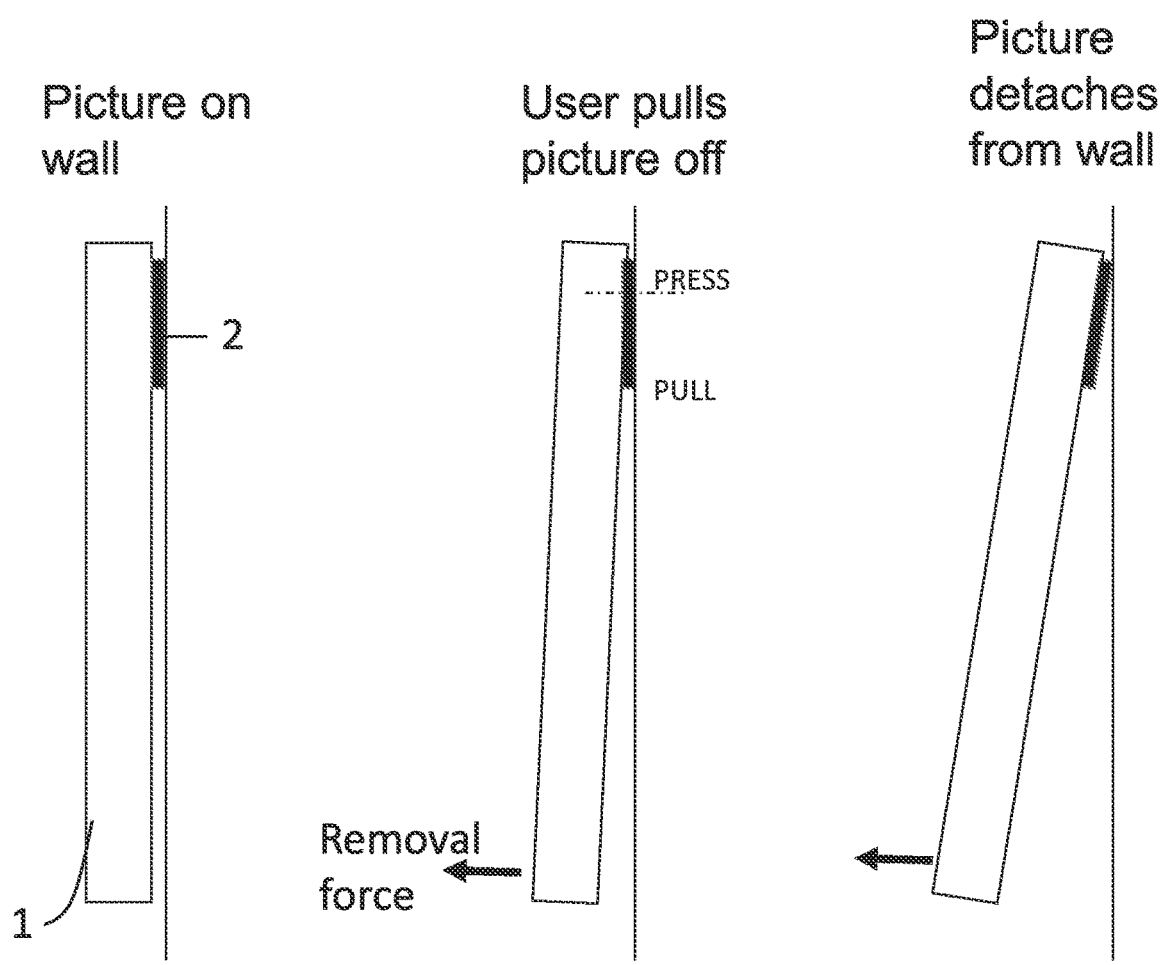
FIG. 1 is a depiction of a prior art assembly for attaching an object to a vertical surface and a process for removal of the object from the vertical surface.

The present invention, in some embodiments thereof, relates to an assembly for attaching decorative objects to a vertical surface, and more particularly, but not exclusively, to a wall hanging decorative assembly including a flexible strip with a removable adhesive and a non-adhesive gap.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring to FIGS. 3A-3D, embodiments of a decorative object assembly for attachment to a vertical surface are shown, in a cross-sectional or lateral view. Referring first to FIG. 3A, assembly 10 includes attachment assembly 11 and decorative block 12. Decorative block 12 may be any three-dimensional object suitable to be hung on a vertical surface. Decorative block 12 may be substantially planar. In one exemplary embodiment, decorative block 12 is a polystyrene foam 8"×8" wall tile with a picture printed thereon. Alternatively, decorative block 12 is any other object that is hung onto a vertical surface, such as a picture printed onto cardboard, canvas, or poster board; or a framed art picture or painting; or an art work made of synthetic fabric, textile, paper, foam, glass, wood, or clay art. The vertical surface onto which the decorative block 12 may be hung may be, for example, a wall, a door, or a window.

The attachment assembly 11 includes flexible planar strip 18. In the embodiment of FIG. 3A, flexible planar strip 18 is made of a thermoplastic polymer, such as polyethylene terephthalate or polypropylene. Flexible planar strip 18 defines an upper edge parallel to the upper edge of the decorative block 12, and a lower edge parallel to the lower edge of the decorative block 12. As used in the pending disclosure, the terms "parallel to the upper edge" and "parallel to the lower edge" describe the general orientation of the upper edge and lower edge of the flexible planar strip, and are not meant to restrict the assembly 10 to orientations that are exactly parallel.

Flexible planar strip 18 is oriented in a vertical direction between the upper and lower edges thereof. As used in this disclosure, the term "vertically upward" refers to a direction toward the upper edge of planar strip 18, and the term "vertically downward" refers to a direction toward the lower edge of flexible planar strip 18.

First layer of adhesive 20 extends vertically downward from the upper edge of flexible planar strip 18. The area of the flexible planar strip 18 onto which the first layer of adhesive 20 is attached is referred to herein as the upper vertical section. First layer of adhesive 20 is a removable adhesive, such as a pressure-sensitive adhesive. In one exemplary embodiment, first layer of adhesive 20 is the removable adhesive that is incorporated into RemoOne® removable adhesive strips.

Attachment mechanism 14 extends vertically upward from the lower edge of flexible planar strip 18, and occupies a lower vertical section of the flexible planar strip. In the embodiment of FIG. 3A, attachment mechanism 14 is a mechanical attachment mechanism that cooperates with a corresponding attachment mechanism in decorative block 12, as will be described further below.

A gap portion is defined on the flexible planar strip 18 in between the upper vertical section and the lower vertical section. The gap portion has neither an adhesive nor an attachment mechanism.

FIG. 3B depicts a second embodiment of a decorative object assembly 110. Decorative object assembly 110 is similar in most respects to decorative object assembly 10, and accordingly similar components are assigned similar reference numerals, except that the reference numerals are preceded by a "1", as shown in the element first layer of adhesive 120. Attachment assembly 111 differs from attachment assembly 11, in that, instead of a mechanical attachment mechanism, second layer of adhesive 116 extends vertically upward from the lower edge of flexible planar strip 118. Second layer of adhesive 116 is a permanent adhesive, and may be any permanent adhesive known to those of skill in the art, for example, a solvent coated adhesive. Second layer of adhesive 116 serves as an attachment mechanism for attaching the flexible planar strip 118 to the decorative block 12.

FIG. 3C depicts a third embodiment of a decorative object assembly 210. Decorative object assembly 210 is similar in most respects to decorative object assembly 10, and accordingly similar components are assigned similar reference numerals, except that the reference numerals are preceded by a "2" as shown in the elements first layer of adhesive 220 and attachment mechanism 214. Attachment assembly 211 differs from attachment assembly 11, in that in place of a flexible planar strip made of a thermoplastic polymer, such as polyethylene terephthalate or polypropylene, the flexible planar strip 219 is made of ethylene-vinyl acetate (EVA) foam. A film layer 221 is attached to the EVA foam planar strip 219. Film layer 221 may be made of polyethylene terephthalate or polypropylene. However, film layer 221 is very thin in comparison to flexible planar strips 18, 118. Film layer 221 provides structural support for the EVA foam planar strip 219. In addition, film layer 221 prevents the EVA foam from being pulled apart and losing its original shape or surface.

FIG. 3D depicts a fourth embodiment of a decorative object assembly 310. Decorative object assembly 310 is similar in most respects to the prior embodiments, and accordingly similar components are assigned similar reference numerals, except that the reference numerals are preceded by a "3" as shown in the element first layer of adhesive 320. Attachment assembly 311 includes a second layer of adhesive 316, identical to second layer of adhesive 116. In addition, attachment assembly 311 includes an EVA foam flexible planar strip 319 and a film layer 321, identical to planar strip 219 and film layer 221.

The use of polyethylene terephthalate, polypropylene, or EVA foam as the material for the flexible planar strip 18, 118, 219, 319 is merely exemplary. Any other material may similarly be used for the flexible planar strip 18, 118, 219, 319, so long as it is sufficiently strong to support the decorative object 12, 112, 212, 312, and sufficiently flexible to flex when the decorative object 12, 112, 212, 312 is removed from the vertical surface, in the manner described below.

Referring now to FIG. 4, a method for removing a decorative object assembly from a vertical surface is illustrated. While embodiment shown in FIG. 4 is that of FIG. 3A, the method depicted in FIG. 4 is equally applicable to any of the embodiments of FIGS. 3B-3D. As shown in the left frame of FIG. 4, first layer of adhesive 20 is releasably attached to a vertical surface 50. Thus, at this stage, decorative object 12 is releasably hung onto the vertical surface 50. In the middle frame of FIG. 4, a user begins to pull the decorative object 12 off of vertical surface 50, by applying a horizontal and upward removal force onto the bottom of the decorative object 12. Instead of the removal force being transferred directly onto the first layer of adhesive 20, as in the prior art depicted in FIG. 1, the removal force is initially applied on the flexible planar portion 18. As shown in the middle frame of FIG. 4, the removal force causes the flexible planar strip 18 to flex, beginning at the gap portion, while the first layer of adhesive 20 remains completely attached to the vertical surface. As shown in the rightmost frame of FIG. 4, continued horizontal and upward movement causes the upward vertical portion of the flexible planar strip to flex. This flexing, in turn, causes the first layer of adhesive 20 to peel off of the vertical surface 50 in a bottom-to-top direction, while the flexible planar strip remains flexed.

Advantageously, the adhesive detaches gradually from the vertical surface 50, reducing the pull strength required to remove the decorative object assembly 10. This, in turn, reduces the stress on a wall surface, and decreases the likelihood of damage to the wall. In addition, the removal is performed in with a simple and ergonomically intuitive motion.

Factors that influence the force required to remove a decorative object from a vertical surface, according to embodiments of the invention, include: the material of the flexible planar strip, the thickness of the flexible vertical strip, and the length of the gap section. The interplay of these factors is illustrated in FIGS. 5A and 5B.

Figure 5A:
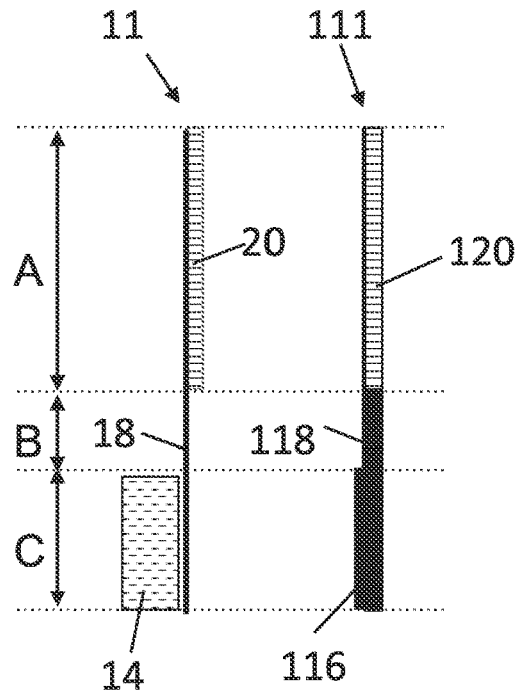
FIGS. 5A and 5B depict the relative dimensions of the upper vertical section, lower vertical section, and gap section of the flexible planar strip of each of the embodiments of FIGS. 3A-3D.
Figure 5B:
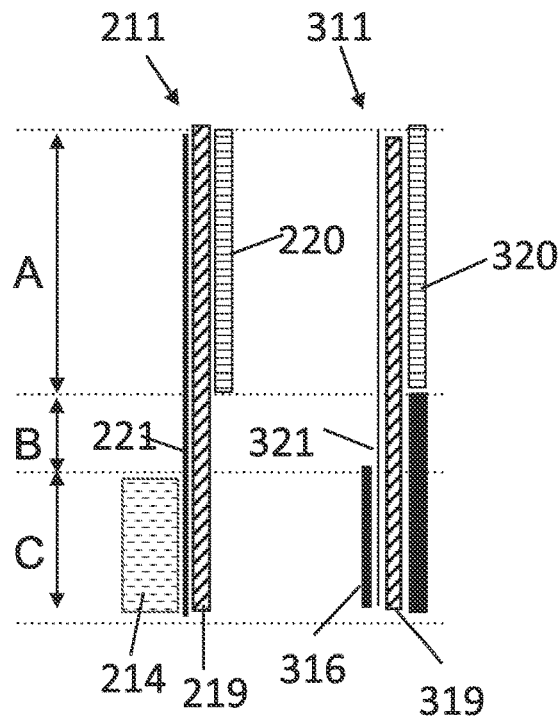

As shown in FIGS. 5A and 5B, for each of the embodiments of attachment assembly 11, 111, 211, 311, the flexible planar strip 18, 118, 219, 319 is divided into three vertical sections, delineated as "A," "B," and "C." Section A is the upper vertical section, on which the removable adhesive is adhered. Section C is the lower vertical section, on which either the mechanical attachment mechanism is formed, or on which the permanent adhesive is adhered. Section B is the gap section, on which no adhesive is adhered.

The following criteria influence the absolute and relative lengths of sections A, B, and C. With respect to section A, the length of section A directly correlates to the amount of removable adhesive that is used, and thus directly affects the strength of a bond between the removable adhesive and a vertical surface. This, in turn, can be selected to vary depending on the weight of the decorative object. The larger the dimension of upper vertical section A, the more adhesive that is used per weight of decorative object.

With respect to dimension C, the length of dimension C depends on the type of permanent adhesive used. In general, it is advantageous to use the minimal possible amount of permanent adhesive, so long as there is no risk of detachment of the decorative object from the flexible planar strip.

The optimal length of the gap section, or dimension B, depends on the flexibility and thickness of the carrier material forming the flexible planar strip. A more flexible material allows for a smaller B dimension, and a more rigid material allows for a larger B dimension.

For example, when the flexible planar strip is made of 0.3 mm thick polyethylene terephthalate (PET), it was determined that: a gap section of 0-3 mm increases significantly the peeling strength needed. A gap section of 4-7 mm was optimal. A gap section of more than 8 mm resulted in a bad user experience, because the picture is lifted far from the wall before the peeling is started, and the user has to "peel the frame" to complete the peeling. Thus, for flexible planar strips made of PET, an optimal vertical length of the gap section is approximately between 10 and 25 times a thickness of the flexible planar strip.

In another example, the flexible planar strip is made of 1/16 inch thick EVA foam. For flexible planar strips made of EVA foam, an optimal vertical length of the gap section is between 2 and 4 times a thickness of the flexible planar strip. In one preferred embodiment, the flexible planar strip made of 1/16 inch thick EVA foam, and the total combined length of sections A, B, and C is 1.4 inches. Section A is 1.0 inches long, section B is 0.15 inches long, and section C is 0.25 inches long.

The width of the flexible planar strip can be customized to the width of the decorative object that it supports. For example, a flexible planar strip that is used to support an 8"×8" decorative block may be 7.5 inches wide.

Figure 6A:
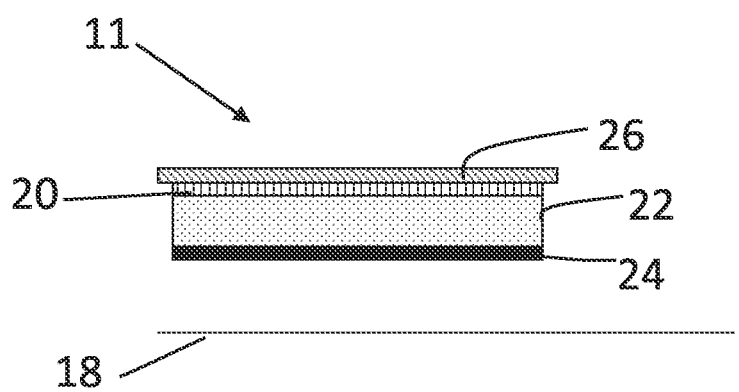
FIGS. 6A and 6B further depict components of the embodiment of FIG. 3A.
Figure 6B:
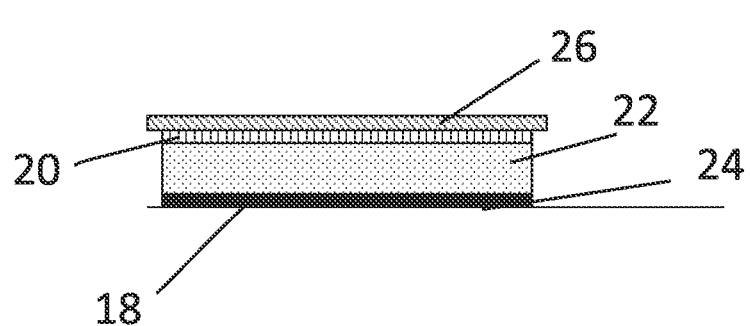

FIGS. 6A and 6B depict additional elements that may be included in the adhesive assemblies 11, according to embodiments of the invention. The elements depicted in FIGS. 6A and 6B may also be incorporated into adhesive assemblies 211. FIG. 6A depicts the attachment assembly 11 prior to attachment of the flexible planar strip 18 to the first layer of adhesive 20, and FIG. 6B depicts the attachment assembly 11 after attachment of the flexible planar strip 18 to the first layer of adhesive 20. As shown in FIGS. 6A and 6B, a foam pad 22 may be disposed between first layer of adhesive 20 and flexible planar strip 18. In an exemplary embodiment, foam pad 22 is 1/16" thick. When a decorative object 10 is mounted against a wall, the foam pad 22 absorbs minor inconsistencies in a surface of the wall. The foam pad 22 thereby reduces the chance of separation of the first layer of adhesive from the wall due to surface bumps.

Foam pad 22 is adhered to flexible planar strip 18 with third layer of adhesive 24. Third layer of adhesive 24 is a permanent adhesive, such as a solvent-based adhesive or any other type of permanent adhesive known to those of skill in the art. Removable siliconized liner 26 is adhered onto the vertical surface-facing side first layer of adhesive 20. Liner 26 may be siliconized on both sides thereof, so that it may be removed and reapplied onto first layer of adhesive 20 from either side. Liner 26 serves to protect removable adhesive 20 and prevent it from accidentally sticking onto surfaces.

Figure 7:
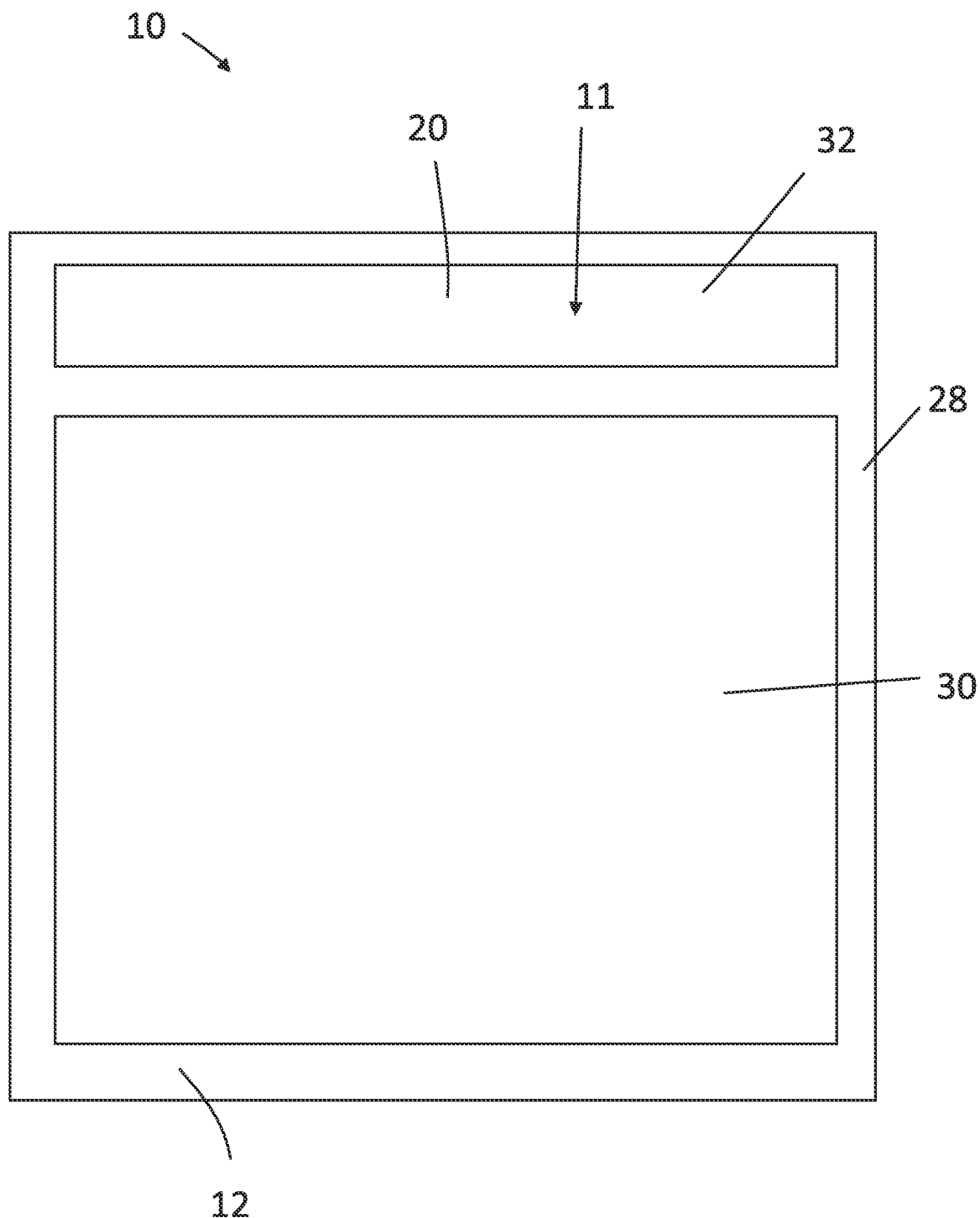
FIG. 7 depicts a decorative object with a frame and a flexible planar strip mechanically attached to the frame; according to embodiments of the invention.

FIGS. 7, 8, and 9A-9B depict one embodiment of a mechanical attachment mechanism between attachment assembly 11 and decorative object 12, according to embodiments of the invention. The descriptions of FIGS. 7-9B are also applicable to attachment assembly 211 and decorative object 212. In FIG. 7, a wall-facing side of the decorative object 12 includes a frame 28. A visible portion 32 of attachment assembly 11, which includes first layer of adhesive 20, is attached to the decorative object 12. The frame 28 defines a border around central interior portion 30 and visible portion 32.

Figure 8:
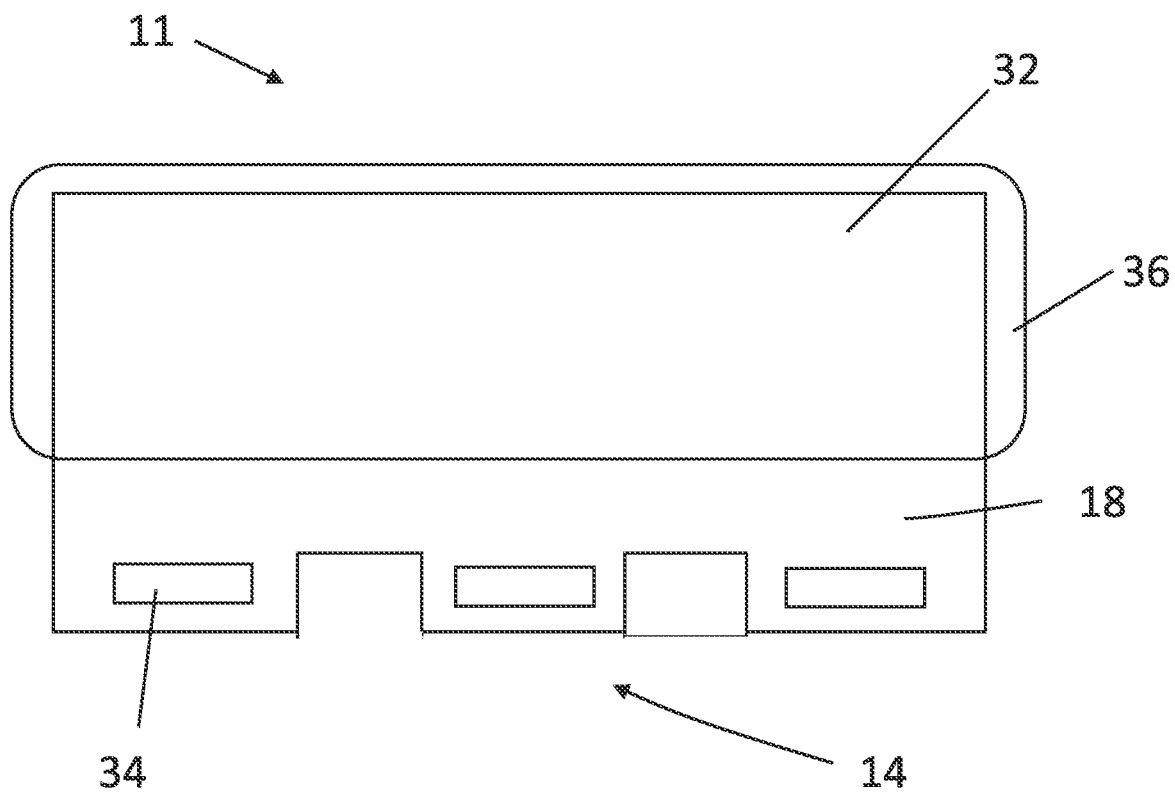
FIG. 8 depicts an attachment mechanism within a flexible planar strip, according to embodiments of the invention.

Referring to FIG. 8, attachment mechanism 14 includes holes 34 in the lower vertical section. The holes 34 may be formed, for example, with a die cutting machine. Visible portion 32 may also include finger lift 36, which protrudes laterally beyond the flexible planar strip 18. Finger lift 36 may be grasped by a user when mechanically attaching the attachment mechanism to the decorative block.

Figure 9A:
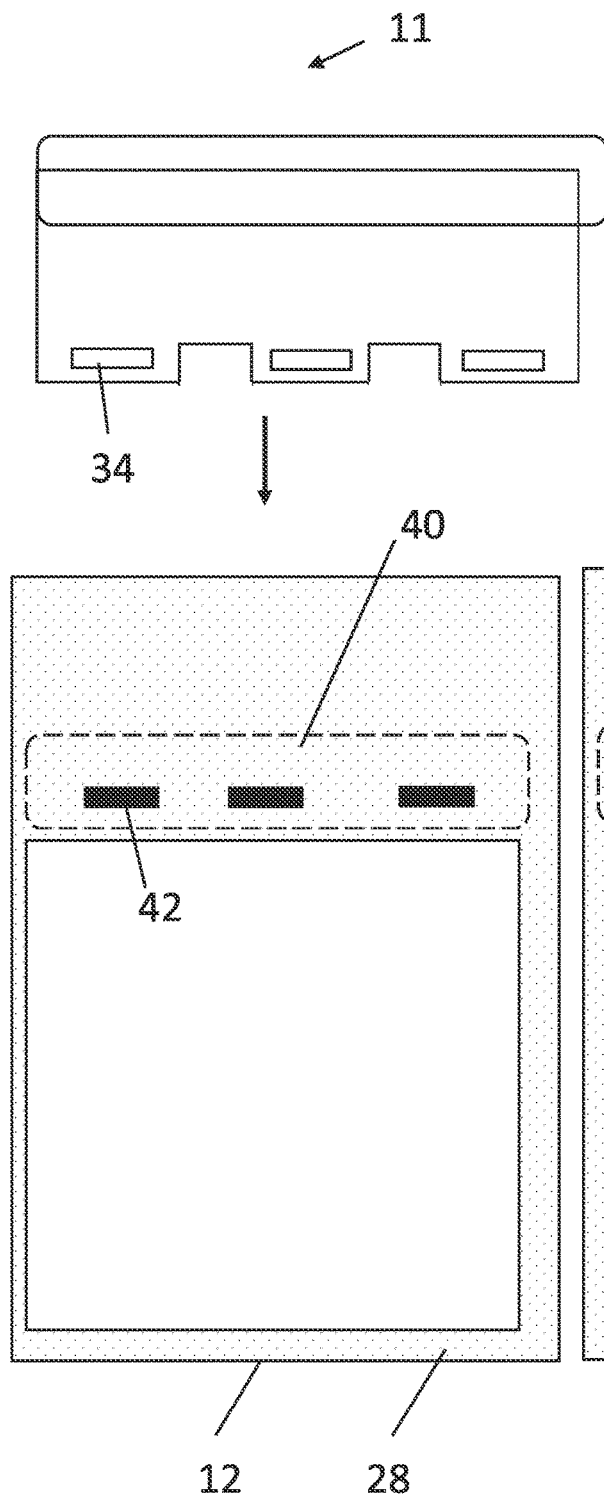
FIGS. 9A and 9B depict attachment of the flexible planar strip of FIG. 8 to the decorative object with a frame of FIG. 7, according to embodiments of the invention.
Figure 9B:
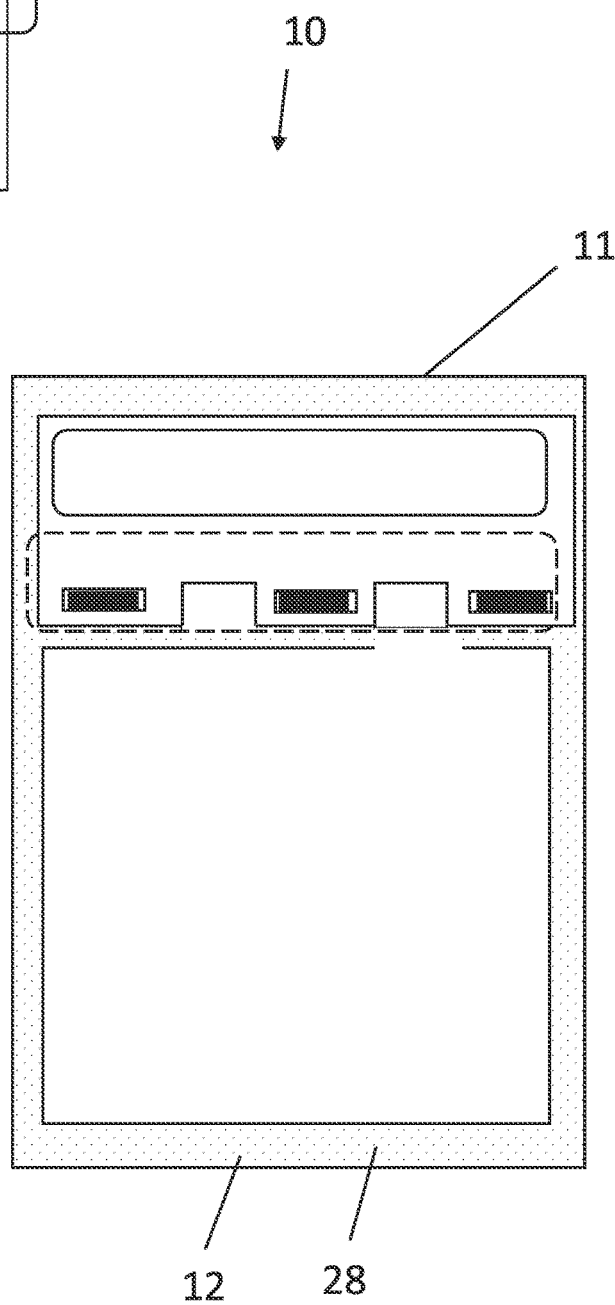

As shown in FIGS. 9A and 9B, a slot 40 is formed within the frame 28. Slot 40 contains protrusions 42, which are aligned with the corresponding holes 34 in the lower vertical section. To attach the attachment assembly 11 to the decorative object 12, a user slides the lower vertical section into the slot 40, and "clicks" the holes 34 over the protrusions 42. When thus attached, the visible portion 32 lays flat against the decorative object 12.

The above-described mechanical attachment mechanism is merely exemplary, and other forms of mechanical attachment may be employed, as is known to those of skill in the art.

Figure 10A:
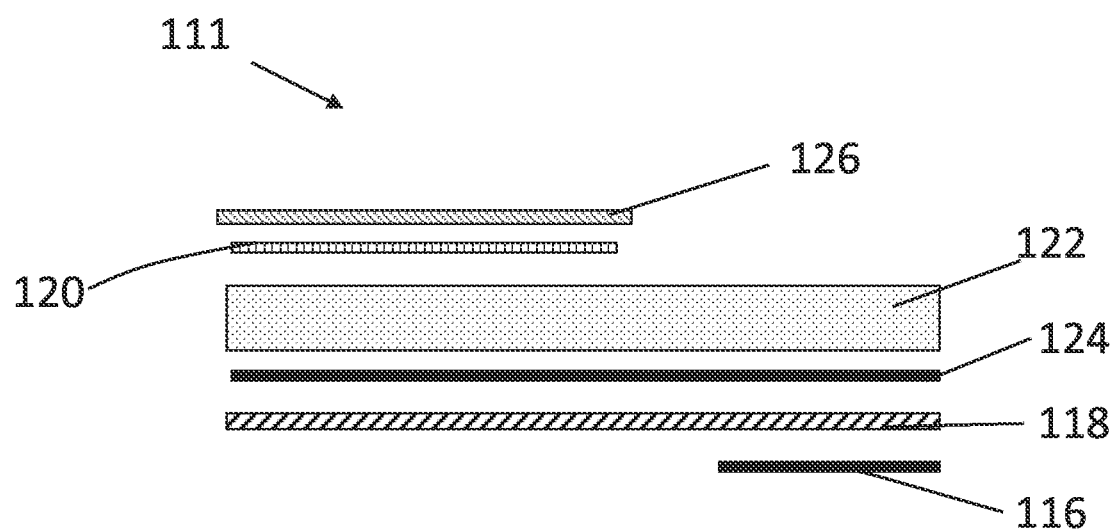
FIGS. 10A and 10B further depict components of the embodiment of FIG. 3B.
Figure 10B:
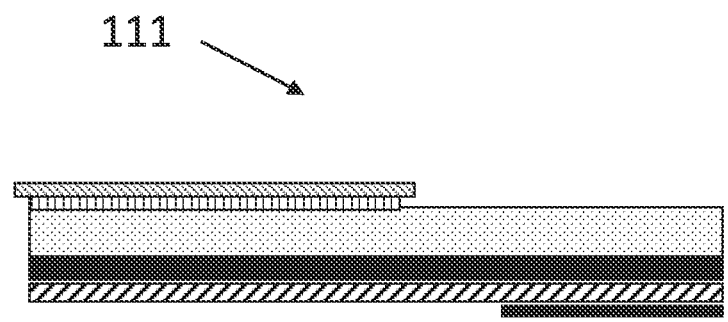

FIGS. 10A and 10B depict additional elements that may be included in the adhesive assemblies 111, according to embodiments of the invention. The elements depicted in FIGS. 10A and 10B may also be incorporated into adhesive assemblies 311. FIG. 10A depicts the attachment assembly 111 prior to attachment of the flexible planar strip 118 to the first layer of adhesive 120, and FIG. 10B depicts the attachment assembly 111 after attachment of the flexible planar strip 118 to the first layer of adhesive 120. FIGS. 10A and 10B include foam pad 122, third layer of adhesive 124, and siliconized liner 126, which are equivalent to foam pad 22, third layer of adhesive 24, and siliconized liner 26, described above.

Foam pad 122 is depicted as extending along the entire length of flexible planar strip 118, so that, when the decorative object 110 is mounted against the wall, a portion of the foam pad 122 directly abuts the wall. This configuration may further allow the foam pad 122 to absorb minor inconsistencies in a surface of the wall. This configuration is also possible in the embodiment of FIGS. 6A and 6B, and vice versa.

The main difference between the embodiment of FIGS. 6A and 6B, versus the embodiment of FIGS. 10A and 10B, is that the attachment assembly 111 includes second layer of adhesive 116.

Figure 11:
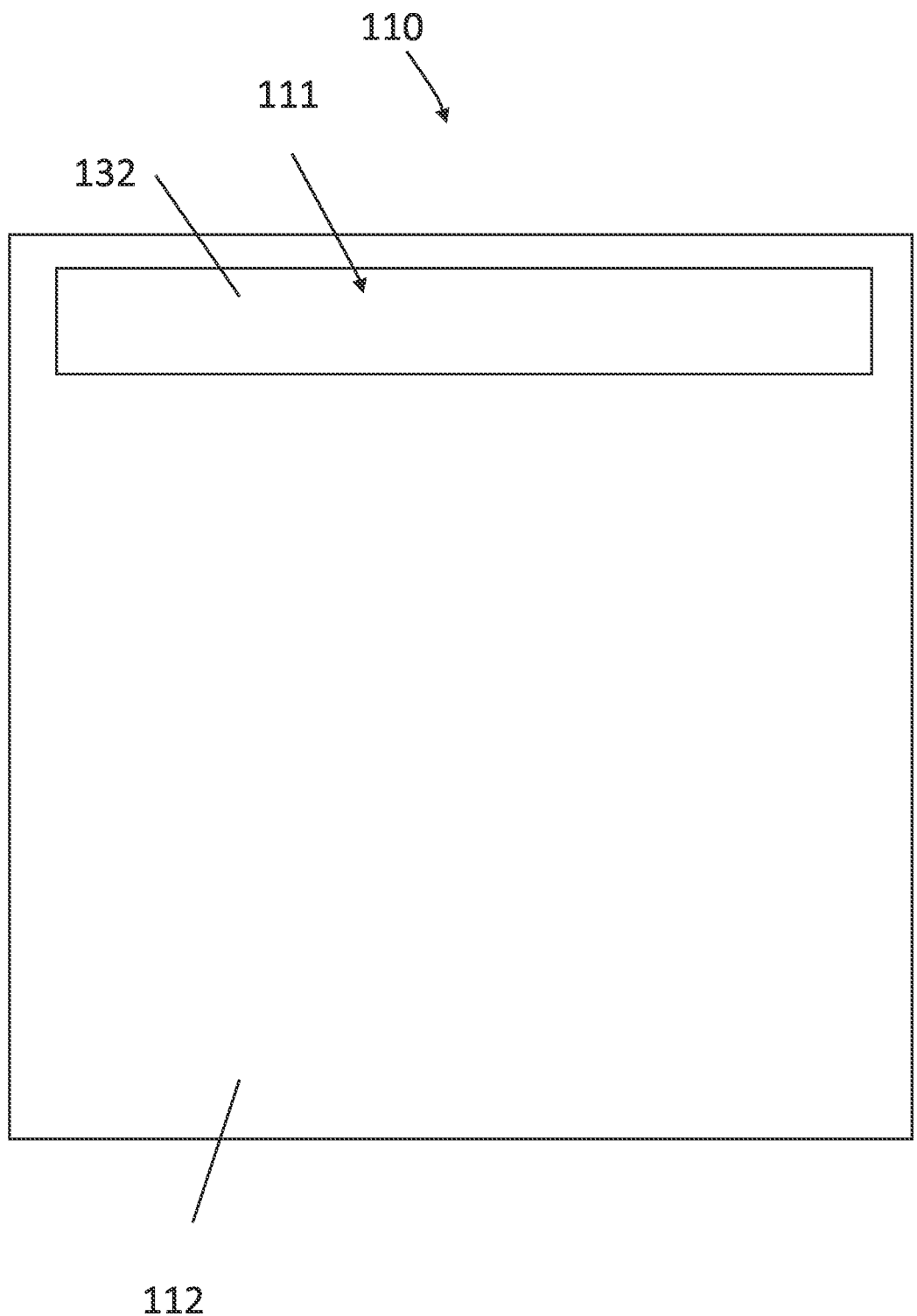
FIG. 11 depicts a decorative object without a frame, according to embodiments of the invention.

As shown in FIG. 11, attachment assembly 111 is attached to the wall-facing side of decorative block 112, by applying second layer of adhesive 116. Because attachment assembly 111 is attached to decorative block 112 is with the second layer of adhesive 116, decorative block 112 is frameless. Following the attachment, visible portion 132 protrudes from the face of decorative block 112.

In the embodiments of FIGS. 3C and 3D, in which the flexible planar strip 219, 319 is made of EVA foam, the EVA foam strip 219, 319, also absorbs minor inconsistencies in a surface of the wall, similar to foam pads 22, 122. In these embodiments, the aesthetics of the adhesive assemblies 211, 311 are improved, as a user sees only a single, whole piece of foam, rather than seeing a film with a piece of foam over it.

It is expected that during the life of a patent maturing from this application many types of adhesive and many suitable polymeric and foam materials for flexible planar strips will be developed and the scope of the terms adhesive, polymer, and foam is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A decorative object assembly for releasable adherence to a vertical surface of a wall, comprising:
    a substantially planar decorative block defining an upper edge and a lower edge;
    a flexible planar strip made of a thermoplastic polymer, and defining an upper edge parallel to the upper edge of the block, a lower edge parallel to the lower edge of the block, and a vertical direction between the upper and lower edges;
    a first layer of adhesive extending vertically downward from the upper edge of the strip, for releasable attachment to the vertical surface;
    a second layer of adhesive as an attachment mechanism for attachment to the decorative block and to an opposing side of the strip as the first layer of adhesive, configured on a lower vertical section of the planar strip; and
    a gap section of the strip positioned vertically between the first layer of adhesive and the lower vertical section, on which no adhesive is adhered, wherein a vertical length of the first layer of adhesive is greater than the vertical length of the lower vertical section, and a vertical length of the lower vertical section is greater than the vertical length of the gap section;
    wherein the flexible planar strip is composed of polyethylene terephthalate or polypropylene,
    wherein a vertical length of the gap section is approximately between 10 and 25 times a thickness of the flexible planar strip.

2. The decorative object assembly as defined in claim 1, wherein the second layer of adhesive is permanently adhered between the block and the strip.

3. The decorative object assembly as defined in claim 1, further comprising a frame configured around the decorative block, and a slot within the frame for receiving therein a lower vertical section of the strip as an attachment mechanism.

4. The decorative object assembly as defined in claim 3, wherein the attachment mechanism is a mechanical attachment for attaching the lower vertical section to the frame, such that, when the mechanical attachment is engaged, the lower vertical section is within the slot and is attached to the frame.

5. The decorative object assembly as defined in claim 4, wherein the mechanical attachment comprises one or more protrusions within the slot that are adapted to cooperate with one or more corresponding holes in the lower section.

6. The decorative object assembly as defined in claim 1, wherein the flexible planar strip is composed of ethylene-vinyl acetate (EVA) foam.

7. The decorative object assembly as defined in claim 6, wherein a vertical length of the gap section is approximately between 2 to 4 times a thickness of the flexible planar strip.

8. The decorative object assembly as defined in claim 6, wherein the flexible planar strip is composed of ethylene-vinyl acetate (EVA) foam is having a 1/16 inch thickness.

9. The decorative object assembly as defined in claim 1, further comprising a foam pad configured between the planar strip and the first layer of adhesive, and permanently adhered to the planar strip with a third layer of adhesive.

10. The decorative object assembly as defined in claim 1, further comprising a removable siliconized liner for lining the first layer of adhesive when it is not adhered to the vertical surface.

11. The decorative object assembly as defined in claim 1, wherein the planar strip is mechanically attached to the decorative block at the upper edge of the decorative block.

\* \* \* \* \*